US011158886B2

United States Patent
Jin et al.

(10) Patent No.: US 11,158,886 B2
(45) Date of Patent: Oct. 26, 2021

(54) COMMUNICATION SYSTEM OF BATTERY PACK AND BATTERY PACK COMPRISING SAME

(71) Applicant: Samsung SDI Co., Ltd., Yongin-si (KR)

(72) Inventors: Kyongpil Jin, Yongin-si (KR); Myungsang Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 224 days.

(21) Appl. No.: 16/466,425

(22) PCT Filed: Jun. 13, 2017

(86) PCT No.: PCT/KR2017/006137
§ 371 (c)(1),
(2) Date: Jun. 4, 2019

(87) PCT Pub. No.: WO2018/105837
PCT Pub. Date: Jun. 14, 2018

(65) Prior Publication Data
US 2020/0076008 A1  Mar. 5, 2020

(30) Foreign Application Priority Data
Dec. 9, 2016  (KR) .................. 10-2016-0167805

(51) Int. Cl.
*H01M 10/42* (2006.01)
*H01M 10/44* (2006.01)
(Continued)

(52) U.S. Cl.
CPC ....... *H01M 10/425* (2013.01); *H01M 10/441* (2013.01); *H01M 10/482* (2013.01);
(Continued)

(58) Field of Classification Search
USPC ...................................................... 320/112
See application file for complete search history.

(56) References Cited

U.S. PATENT DOCUMENTS 7,542,329 B2  6/2009  Cheng et al.
8,867,246 B2  10/2014  Abe et al.
(Continued)

FOREIGN PATENT DOCUMENTS

CN  101110420 A  1/2008
CN  101908770 A  12/2010
(Continued)

OTHER PUBLICATIONS

International Search Report for corresponding International Application No. PCT/KR2017/006137, dated Sep. 18, 2017, 3pp.
(Continued)

*Primary Examiner* — Mohammed Alam
(74) *Attorney, Agent, or Firm* — Lewis Roca Rothgerber Christie LLP

(57) ABSTRACT

Provided are a communication system of a battery pack, and a battery pack including the communication system. According to an embodiment of the present disclosure, the communication system includes a transmitter configured to transmit a communication signal from the battery pack to an external device and a receiver configured to receive a communication signal from the external device, wherein the transmitter includes: a first transistor configured to perform a switching operation in response to a first communication signal output from a battery management system (BMS) of the battery pack; a second transistor configured to perform a switching operation in response to the switching operation of the first transistor; and a first diode configured to transmit the first communication signal to the external device in response to the switching operations of the first and second transistors, wherein the receiver includes: a third transistor
(Continued)

configured to perform a switching operation in response to a second communication signal received from the external device; a fourth transistor configured to perform a switching operation in response to the switching operation of the third transistor; and a second diode configured to transmit the second communication signal to the BMS in response to the switching operations of the second and fourth transistors.

13 Claims, 2 Drawing Sheets

(51) Int. Cl.
  *H01M 10/48* (2006.01)
  *H02J 7/00* (2006.01)
  *H04B 1/40* (2015.01)
(52) U.S. Cl.
  CPC .......... *H02J 7/0024* (2013.01); *H02J 7/0026* (2013.01); *H01M 2010/4271* (2013.01); *H01M 2010/4278* (2013.01); *H04B 1/40* (2013.01)

(56) References Cited

U.S. PATENT DOCUMENTS

| | | | |
|---|---|---|---|
| 9,184,615 | B2 | 11/2015 | Kim |
| 2007/0188950 | A1 | 8/2007 | Liu et al. |
| 2011/0193526 | A1 | 8/2011 | Yang et al. |
| 2012/0126749 | A1 | 5/2012 | Kim |
| 2013/0221924 | A1 | 8/2013 | Sim et al. |
| 2014/0301005 | A1 | 10/2014 | Genova et al. |
| 2015/0263559 | A1 | 9/2015 | Kim |
| 2015/0280464 | A1 | 10/2015 | Kang et al. |
| 2016/0261125 | A1* | 9/2016 | Kang ................ B60L 58/12 |
| 2018/0277801 | A1* | 9/2018 | Brozek ............. H01M 10/441 |
| 2019/0379215 | A1* | 12/2019 | Jeong .............. H02J 7/0016 |
| 2020/0076008 | A1* | 3/2020 | Jin ................. H01M 10/425 |
| 2020/0106081 | A1* | 4/2020 | Suzuki ................ B25F 5/00 |
| 2020/0144678 | A1* | 5/2020 | Kim ................. H01M 50/543 |

FOREIGN PATENT DOCUMENTS

| | | |
|---|---|---|
| CN | 103683370 A | 3/2014 |
| CN | 204633429 U | 9/2015 |
| JP | 10-271691 A | 10/1998 |
| JP | 5412797 B2 | 2/2014 |
| JP | 2014-235839 A | 12/2014 |
| KR | 10-0478358 B1 | 3/2005 |
| KR | 10-1222248 B1 | 1/2013 |
| KR | 10-2013-0098680 A | 9/2013 |
| KR | 10-2015-0033545 A | 4/2015 |
| KR | 10-2015-0106695 A | 9/2015 |

OTHER PUBLICATIONS

Chinese Office Action, with English translation, dated Jun. 17, 2020, for corresponding Chinese Patent Application No. 201780075318.8 (14 pages).

EPO Extended Search Report dated Apr. 8, 2020, for corresponding European Patent Application No. 17878310.6 (7 pages).

\* cited by examiner

COMMUNICATION SYSTEM OF BATTERY PACK AND BATTERY PACK COMPRISING SAME

CROSS-REFERENCE TO RELATED APPLICATION(S)

This application is a National Phase Patent Application of International Patent Application Number PCT/KR2017/006137, filed on Jun. 13, 2017, which claims priority of Korean Patent Application No. 10-2016-0167805, filed Dec. 9, 2016. The entire contents of both of which are incorporated herein by reference.

TECHNICAL FIELD

The present disclosure relates to a communication system of a battery pack and a battery pack including the communication system, and more particularly, to a communication system configured such that when a battery pack including a low side FET communicates with an external system, a battery ground of a communication unit and a ground of the external system are physically separated to prevent a communication unit from consuming excessive current and being damaged by high voltage, and a battery pack including the communication system.

BACKGROUND ART

A battery pack may include a battery management system (BMS), and the BMS may apply a protection FET as a hide side or low side FET according to the type of a battery IC.

A high side FET refers to a structure for controlling the gate of a protection FET with respect to battery power by using a charge pumping circuit provided in a battery IC. In addition, a low side FET refers to a structure for controlling the gate of a protection FET with respect to a battery ground voltage.

When the battery IC is capable of performing communication and thus communicates with an external device or system connected to the battery pack, the possibility of performing communication when the protection FET is turned off is determined according to the position of the protection FET (high side or low side).

FIG. 1 is a schematic view illustrating a communication system of a battery pack of the related art. Referring to FIG. 1, a battery IC communicates with a receiver end SET RX and a transmitter end SET TX of an external system through a pack transmitter end Pack TX and a pack receiver end Pack RX.

When a low side FET is applied to the battery pack shown in FIG. 1, an overcurrent may occur. Thus, when the battery pack is left, a low-voltage failure may occur, and in some cases, a BMS failure and a system hardware failure may be caused.

DESCRIPTION OF EMBODIMENTS

Technical Problem

Objectives of the present disclosure are to provide a communication system of a battery pack including a low side FET, the communication system being configured to prevent a communication unit from consuming excessive current and being damaged by high voltage when the battery pack and an external system communicate with each other, and to provide a battery pack including the communication system.

Solution to Problem

According to an embodiment of the present disclosure, there is provided a communication system of a battery pack, the communication system including a transmitter configured to transmit a communication signal from the battery pack to an external device and a receiver configured to receive a communication signal from the external device, wherein the transmitter includes: a first transistor configured to perform a switching operation in response to a first communication signal output from a battery management system (BMS) of the battery pack; a second transistor configured to perform a switching operation in response to the switching operation of the first transistor; and a first diode configured to transmit the first communication signal to the external device in response to the switching operations of the first and second transistors, wherein the receiver includes: a third transistor configured to perform a switching operation in response to a second communication signal received from the external device; a fourth transistor configured to perform a switching operation in response to the switching operation of the third transistor; and a second diode configured to transmit the second communication signal to the BMS in response to the switching operations of the second and fourth transistors.

In addition, the first and third transistors may be P-type transistors, and the second and fourth transistors may be N-type transistors.

In addition, an emitter of the first transistor may be connected to an anode of the first diode, and a cathode of the first diode may be connected to a collector of the second transistor.

In addition, a collector of the first transistor may be connected to a base of the second transistor, wherein the first transistor may be turned off by the first communication signal when the first communication signal has a high level, and the second transistor may be turned off when the first transistor is turned off, wherein the first diode may be configured to transmit the first communication signal to the external device when the first communication signal has a high level.

In addition, the first communication signal output from the BMS may be transmitted to the external device through the first and second transistors when the first communication system has a low level.

In addition, a ground of the battery pack and a ground of the external device may be electrically separated from each other.

In addition, a collector of the third transistor may be connected to a base of the fourth transistor, wherein the third transistor may be turned off by the second communication signal when the second communication signal has a high level, and the fourth transistor may be turned off when the third transistor is turned off, wherein the second diode may be configured to transmit the second communication signal to the BMS when the second communication signal has a high level.

In addition, the second communication signal output from the external device may be transmitted to the BMS through the third and fourth transistors when the second communication system has a low level.

According to another embodiment of the present disclosure, a battery pack includes: the communication system of the embodiment; a plurality of battery cells that are rechargeable; a charge-discharge control switch connected to a negative (−) terminal of the plurality of battery cells; and a BMS configured to monitor states of the plurality of battery cells, control a switching operation of the charge-discharge control switch, and output a communication signal to the communication system.

Advantageous Effects of Disclosure

The present disclosure may provide a communication system of a battery pack to which a low side FET is applied, the communication system being configured to prevent a communication unit from consuming excessive current and being damaged by high voltage when the battery pack and an external system communicate with each other. The present disclosure may also provide a battery pack including the communication system.

BEST MODE

Figure 1:
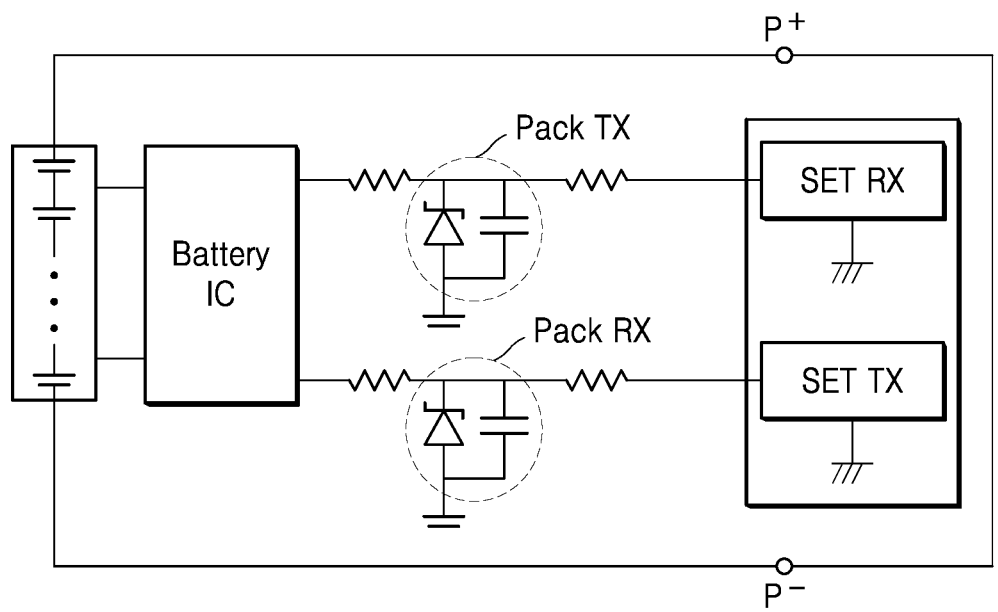
FIG. 1 is a schematic view illustrating a communication system of a battery pack of the related art.

Hereinafter, example embodiments will be described in detail with reference to the accompanying drawings. However, various other embodiments may be possible, and the embodiments described herein are not for purposes of limitation. These embodiments are provided so that the present disclosure will be thorough and complete, and will fully convey the scope of the present disclosure to those skilled in the art.

In the following description, technical terms are used only for explaining specific embodiments while not limiting the scope and spirit of the present disclosure. The terms of a singular form may include plural forms unless otherwise mentioned. It will be understood that terms such as "comprise," "include," and "have," when used herein, specify the presence of stated features, integers, steps, operations, elements, components, or combinations thereof, but do not preclude the presence or addition of one or more other features, integers, steps, operations, elements, components, or combinations thereof. It will be understood that although the terms "first" and "second" are used herein to describe various elements, these elements should not be limited by these terms. These terms are only used to distinguish one element or component from other elements or components.

Hereinafter, example embodiments will be described in detail with reference to the accompanying drawings. In the present disclosure, like reference numerals denote like elements. In the drawings, the same or corresponding elements are denoted with the same reference numeral, and will not be repeatedly described.

Figure 2:
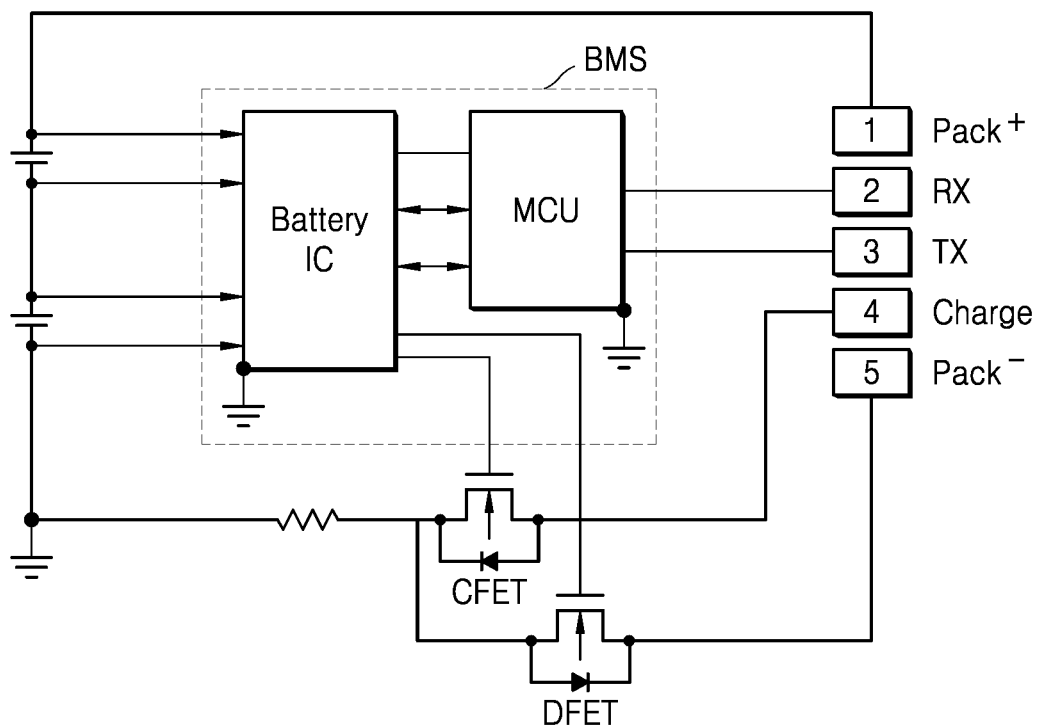
FIG. 2 is a schematic view illustrating a configuration of a battery pack to which a communication system is applied according to an embodiment of the present disclosure.

FIG. 2 is a schematic view illustrating a configuration of a battery pack to which a communication system is applied according to an embodiment of the present disclosure.

Referring to FIG. 2, the battery pack includes: a plurality of battery cells; and a battery management system (BMS) configured to monitor the states of the battery cells. In addition, the BMS controls charge and discharge operations of the battery pack by controlling switching operations of a charge control FET (CFET) and a discharge control FET (DFET).

The battery pack may include a positive (+) terminal Pack+ and a negative (−) terminal Pack− that correspond to the battery cells and may be connected to an external device through the positive and negative terminals Pack+ and Pack−. The external device may be a load that receives electricity from the battery pack or a charging device that supplies electricity to the battery pack to charge the battery cells.

The BMS may include a battery IC and a micro controller unit (MCU), and the MCU may function as a communication system according to an embodiment of the present disclosure. The MCU may be connected to a transmitter end TX and a receiver end RX of the communication system to receive communication signals from the external device or transmit communication signals to the external device.

Low side FETs are applied to the battery pack to which the communication system is applied according to an embodiment of the present disclosure, and the low side FETs mean that the CFET and the DFET are connected to a negative (−) terminal of the battery cells as shown in FIG. 2.

When the DFET is turned off to protect the battery pack, the battery pack communicates with a battery ground GND, and the external device communicates with a pack terminal. In this case, the battery pack and the external device do not communicate with each other.

In addition, when the negative terminal Pack− is at a floating level and an internal capacitor of the external device is fully discharged, the voltages of the negative terminal Pack−, the transmitter end TX, and the receiver end RX increase to the voltage level of the positive terminal Pack+, and since the transmitter end TX and the receiver end RX of the battery pack are connected to a certain voltage level (for example, 3.3 V), an overvoltage is applied to the transmitter end TX and the receiver end RX.

Referring again to FIG. 1, resistors and Zener diodes may be arranged between the battery pack and the receiver end SET RX and the transmitter end SET TX of the external system. The resistors and the Zener diodes shown in FIG. 1 may be used for communication ends between the battery pack shown in FIG. 2 and the external device.

An overvoltage is applied to the resistors and the Zener diodes, and thus current consumption occurs. When characteristic values of the resistors and the Zener diodes are not properly set, excessive current consumption may occur, and thus when the battery pack is left, a low voltage failure may occur. Furthermore, in some cases, a BMS failure and an overall system hardware failure may be caused.

MODE OF DISCLOSURE

Figure 3:
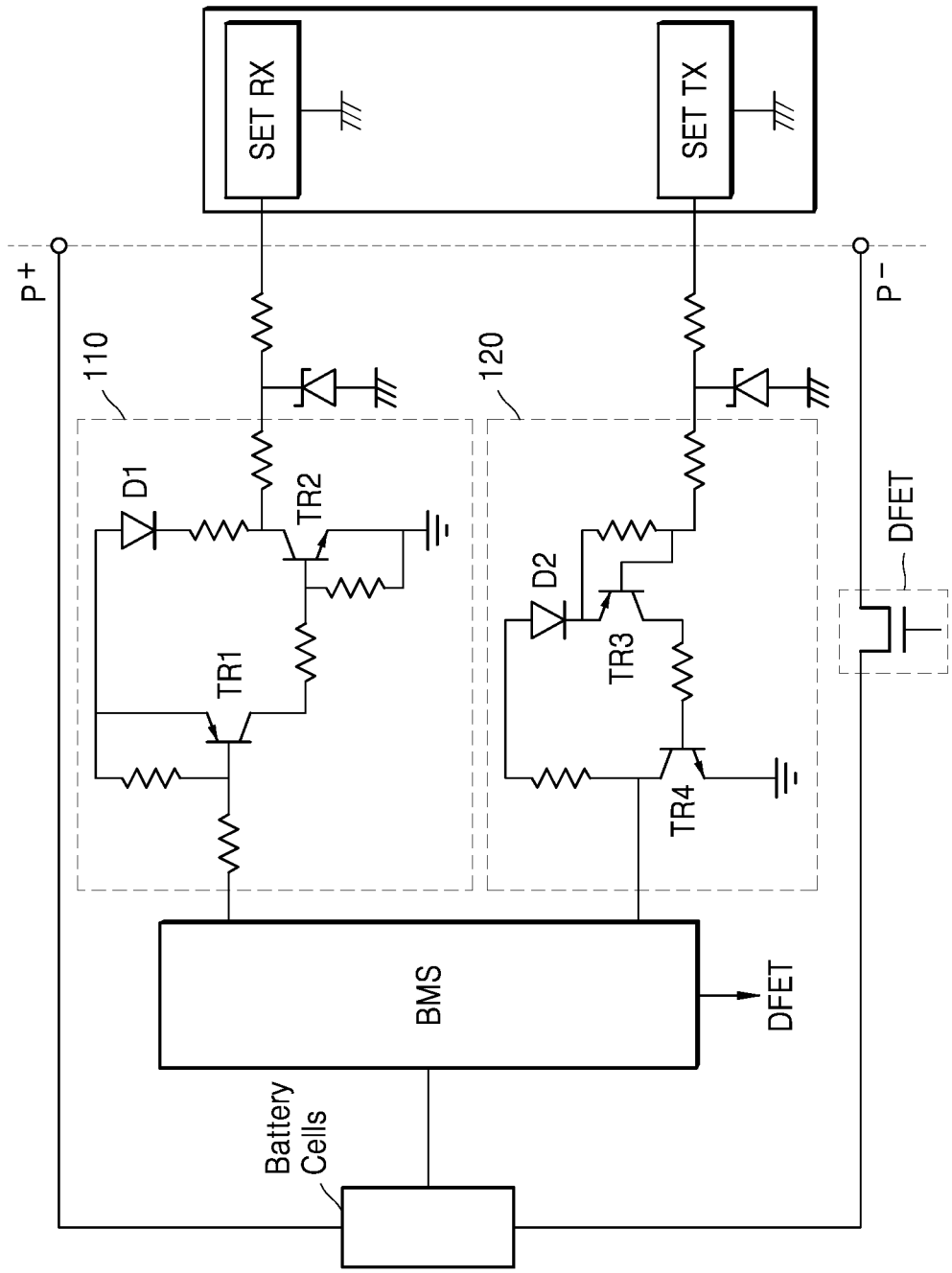
FIG. 3 is a schematic view illustrating a configuration of a communication system of a battery pack according to an embodiment of the present disclosure.

FIG. 3 is a schematic view illustrating a configuration of a communication system of a battery pack according to an embodiment of the present disclosure.

Referring to FIG. 3, according to the embodiment of the present disclosure, the communication system is for the battery pack and an external device connected to the battery pack and is configured to separate a ground of the battery pack and a ground of the external device.

The communication system of the battery pack according to the embodiment of the present disclosure includes: a transmitter 110 configured to transmit communication signals from the battery pack to the external device; and a receiver 120 configured to receive communication signals from the external device. Referring to FIG. 3, the communication system may include the transmitter 110, the receiver 120, and a portion of a battery management system (BMS).

The battery pack may include a plurality of battery cells, and a battery module may be constructed by connecting the battery cells in series with each other, or connecting battery cells in series and then connecting groups of series-connected battery cells in parallel.

The BMS monitors the states of the battery cells and controls charge and discharge operations of the battery pack. In addition, the battery pack, to which the communication system of the present disclosure is applied, includes a low side FET. That is, as shown in FIG. 3, a discharge control FET (DFET) is connected to a terminal P– of the battery pack.

The battery pack may include the DFET and a charge control FET (CFET, not shown), the CFET may be connected in series or parallel with the DFET, and switching operations may be controlled by the BMS.

In addition, the transmitter 110 includes a first transistor TR1, a second transistor TR2, and a first diode D1. The first transistor TR1 performs a switching operation in response to a first communication signal output from the BMS of the battery pack. The second transistor TR2 performs a switching operation in response to the switching operation of the first transistor TR1.

For example, when a first communication signal having a high level is output from the BMS, the first transistor TR1 may be turned off by the first communication signal having a high level, and accordingly, the second transistor TR2 may also be turned off.

The first diode D1 may transmit the first communication signal to the external device in response to the switching operations of the first transistor TR1 and the second transistor TR2.

In an embodiment, the first diode D1 may transmit the first communication signal to the external device when the first transistor TR1 and the second transistor TR2 are turned off. At this time, the first communication signal may be transmitted from the BMS to a receiver end SET RX of the external device via the first diode D1.

In addition, the first transistor TR1 may be a P-type transistor configured to be turned off by a first communication signal having a high level. The second transistor TR2 may be an N-type transistor configured to be turned off when the first transistor TR1 is turned off.

Under the condition in which the first transistor TR1 and the second transistor TR2 are respectively a P-type transistor and an N-type transistor, when a first communication signal having a low level is output from the BMS, the first transistor TR1 is turned on, and accordingly, the second transistor TR2 is also turned on. Therefore, the first communication signal having a low level may be transmitted to the receiver end SET RX of the external device through the first transistor TR1 and the second transistor TR2.

In addition, an emitter of the first transistor TR1 may be connected to an anode of the first diode D1, and a cathode of the first diode D1 may be connected to a collector of the second transistor TR2. In addition, a base of the first transistor TR1 may be connected to the BMS to receive a first communication signal output from the BMS. In addition, a collector of the first transistor TR1 may be connected to a base of the second transistor TR2.

In addition, the receiver 120 includes a third transistor TR3, a fourth transistor TR4, and a second diode D2. The third transistor TR3 performs a switching operation in response to a second communication signal received from the external device, and the fourth transistor TR4 performs a switching operation in response to the switching operation of the first transistor TR3.

For example, when a second communication signal having a high level is output from the BMS, the third transistor TR3 may be turned off by the second communication signal having a high level, and accordingly, the fourth transistor TR4 may also be turned off.

The second diode D2 may transmit the second communication signal to the BMS in response to the switching operations of the third and fourth transistors TR3 and TR4.

In an embodiment, the second diode D2 may transmit the second communication signal to the BMS when the third transistor TR3 and the fourth transistor TR4 are turned off. At this time, the second communication signal is transmitted from a transmitter end SET RX of the external device to the BMS through the second diode D2.

In addition, the third transistor TR1 may be a P-type transistor configured to be turned off by a second communication signal having a high level. The fourth transistor TR4 may be an N-type transistor configured to be turned off when the third transistor TR3 is turned off.

Under the condition in which the third transistor TR3 and the fourth transistor TR4 are respectively a P-type transistor and an N-type transistor, when a second communication signal having a low level is output from the transmitter end SET TX of the external device, the third transistor TR3 is turned on, and accordingly, the fourth transistor TR4 is also turned on. Therefore, the second communication signal having a low level may be transmitted to the BMS through the third transistor TR3 and the fourth transistor TR4.

In addition, an emitter of the third transistor TR3 may be connected to a cathode of the second diode D2, and an anode of the second diode D2 may be connected to a collector of the fourth transistor TR4. In addition, a base of the third transistor TR3 may be connected to the transmitter end SET TX of the external device to receive a second communication signal output from the transmitter end SET TX of the external device. In addition, a collector of the third transistor TR3 may be connected to a base of the fourth transistor TR4.

As described above with reference to FIG. 3, a communication signal having a low level may be transmitted between the battery pack and a communication end (the transmitter end SET TX or the receiver end SET RX) of the external device through the transistors of the transmitter 110 or the receiver 120. Likewise, a communication signal having a high level may be transmitted between the battery pack and a communication end (the transmitter end SET TX or the receiver end SET RX) of the external device through the diode of the transmitter 110 or the receiver 120.

According to the communication system of the battery pack of the present disclosure, since the ground of the battery pack is physically separated from the ground of the communication ends of the external device connected to the battery pack, the current consumption of a communication unit of the battery pack may be reduced and hardware damage caused by high voltage may be reduced.

While some embodiments have been described, it will be understood that various embodiments may be made within the scope of the present disclosure. In addition, non-described equivalents of the above-described elements may also be within the scope of the present disclosure. Therefore, the scope and spirit of the present disclosure should be defined by the following claims.

INDUSTRIAL APPLICABILITY

The present disclosure relates to a communication system for a battery pack and a battery pack including the communication system. More particularly, the present disclosure may provide a communication system configured such that when a battery pack including a low side FET communicates with an external system, a battery ground of a communication unit and a ground of the external system are physically separated to prevent a communication unit from consuming excessive current and being damaged by high voltage, and the present disclosure may also provide a battery pack including the communication system.

The invention claimed is:

1. A communication system of a battery pack, the communication system comprising a transmitter configured to transmit a communication signal from the battery pack to an external device and a receiver configured to receive a communication signal from the external device,
   wherein the transmitter comprises:
   a first transistor configured to perform a switching operation in response to a first communication signal output from a battery management system (BMS) of the battery pack;
   a second transistor configured to perform a switching operation in response to the switching operation of the first transistor; and
   a first diode configured to transmit the first communication signal to the external device in response to the switching operations of the first and second transistors,
   wherein the receiver comprises:
   a third transistor configured to perform a switching operation in response to a second communication signal received from the external device;
   a fourth transistor configured to perform a switching operation in response to the switching operation of the third transistor; and
   a second diode configured to transmit the second communication signal to the BMS in response to the switching operations of the third and fourth transistors.

2. The communication system of claim 1, wherein the first and third transistors are P-type transistors, and the second and fourth transistors are N-type transistors.

3. The communication system of claim 1, wherein an emitter of the first transistor is connected to an anode of the first diode, and a cathode of the first diode is connected to a collector of the second transistor.

4. The communication system of claim 1, wherein a collector of the first transistor is connected to a base of the second transistor,
   wherein the first transistor is turned off by the first communication signal when the first communication signal has a high level, and the second transistor is turned off when the first transistor is turned off, and
   wherein the first diode is configured to transmit the first communication signal to the external device when the first communication signal has a high level.

5. The communication system of claim 1, wherein the first communication signal output from the BMS is transmitted to the external device through the first and second transistors when the first communication signal has a low level.

6. The communication system of claim 1, wherein a ground of the battery pack and a ground of the external device are electrically separated from each other.

7. The communication system of claim 1, wherein a collector of the third transistor is connected to a base of the fourth transistor,
   wherein the third transistor is turned off by the second communication signal when the second communication signal has a high level, and the fourth transistor is turned off when the third transistor is turned off, and
   wherein the second diode is configured to transmit the second communication signal to the BMS when the second communication signal has a high level.

8. The communication system of claim 1, wherein the second communication signal output from the external device is transmitted to the BMS through the third and fourth transistors when the second communication signal has a low level.

9. A battery pack comprising:
   the communication system of claim 1;
   a plurality of battery cells that are rechargeable;
   a charge-discharge control switch connected to a negative (-) terminal of the plurality of battery cells; and
   a BMS configured to monitor states of the plurality of battery cells, control a switching operation of the charge-discharge control switch, and output a communication signal to the communication system.

10. The communication system of claim 1, wherein the second transistor is connected to the first transistor to be turned on and turned off together with the first transistor in response to the switching operation of the first transistor.

11. The communication system of claim 10, wherein the first diode is connected between electrodes of the first and second transistors, and is configured to transmit the first communication signal to the external device in response to the first transistor and the second transistor being turned off.

12. The communication system of claim 1, wherein the fourth transistor is connected to the third transistor to be turned on and turned off together with the third transistor in response to the switching operation of the third transistor.

13. The communication system of claim 12, wherein the second diode is connected between electrodes of the third and fourth transistors, and is configured to transmit the second communication signal to the BMS in response to the third transistor and the fourth transistor being turned off.

* * * * *